United States Patent [19]

Nagai et al.

[11] Patent Number: 4,872,308
[45] Date of Patent: Oct. 10, 1989

[54] EXHAUST DEVICE FOR WORKING MACHINE

[75] Inventors: Noboru Nagai, Hachioji; Yoshisato Hashimoto; Yoshihiko Tsuboike, both of Tokyo; Noboru Kaito, Koganei, all of Japan

[73] Assignee: Kioritz Corporation, Tokyo, Japan

[21] Appl. No.: 204,124

[22] Filed: Jun. 8, 1988

[30] Foreign Application Priority Data

Jun. 18, 1987 [JP] Japan ............................ 62-93630[U]

[51] Int. Cl.$^4$ .......................... F02B 35/00; F01N 3/02
[52] U.S. Cl. ...................................... 60/316; 60/319; 123/41.64
[58] Field of Search ...................... 60/316, 317, 319; 123/41.64

[56] References Cited

U.S. PATENT DOCUMENTS

| | | |
|---|---|---|
| 4,060,985 | 12/1977 | Fukushima ........................ 123/41.64 |
| 4,142,607 | 3/1979 | Landwehr et al. . |
| 4,164,989 | 8/1979 | Lux et al. . |
| 4,674,146 | 6/1987 | Tuggle et al. . |

Primary Examiner—Douglas Hart

[57] ABSTRACT

An exhaust device for a working machine in which a mixing tubular member is disposed opposite to an outlet opening of the muffler through a space interposed between them, and an air-flow passage is provided to introduce a portion of pressurized air from a blower into the inside of an air guide wall on the outer periphery of the outlet opening.

2 Claims, 1 Drawing Sheet

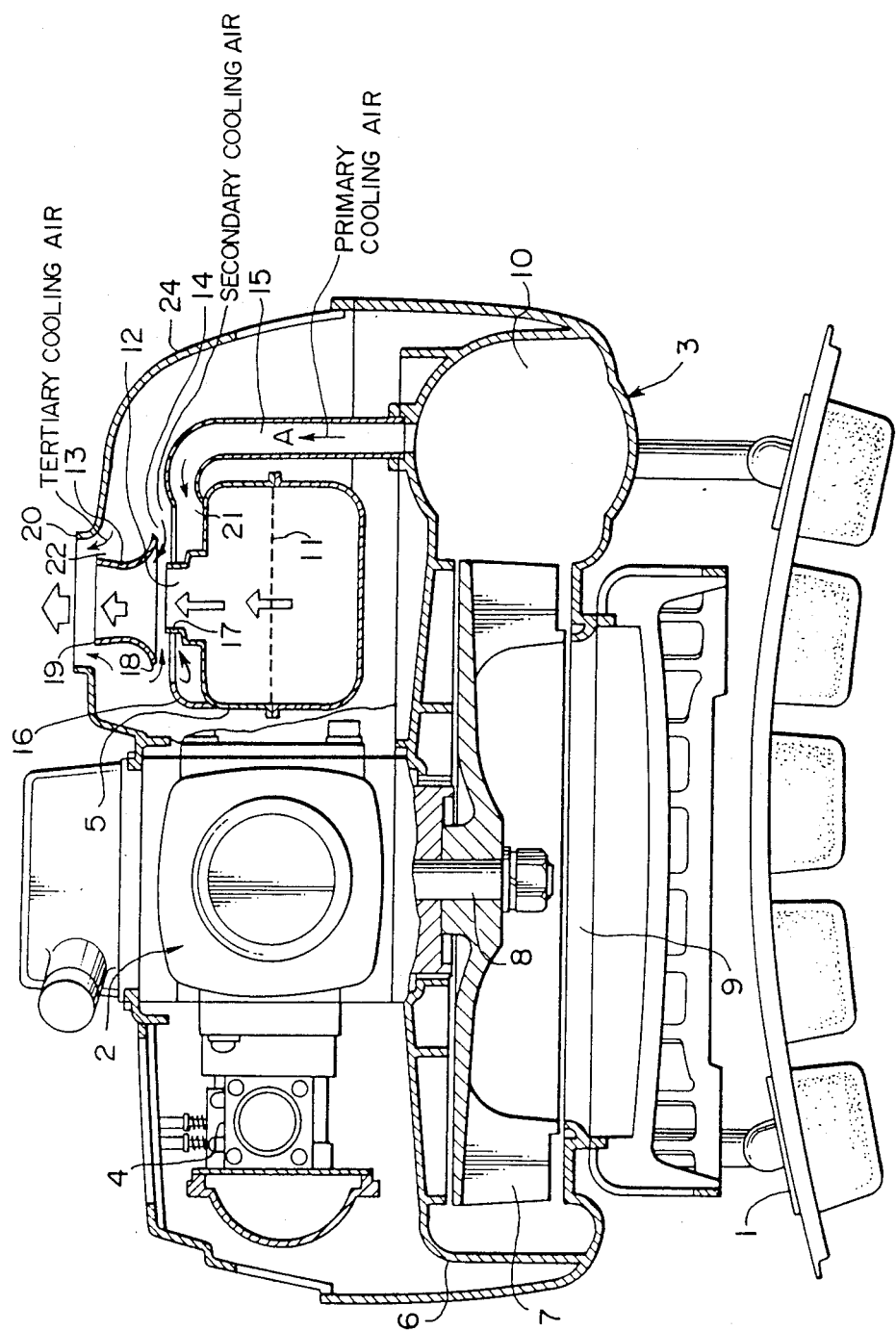

EXHAUST DEVICE FOR WORKING MACHINE

BACKGROUND OF THE INVENTION

1. Field of Invention

This invention relates to an exhaust device for a working machine comprising an internal combustion engine mounted as a power source, a muffler connected to the internal combustion engine for discharging exhaust gas delivered from the internal combustion engine while damping its sound, and a blower driven by the internal combustion engine and, more particularly, to a working machine such as a shoulder-type blower working machine which is handled relatively adjacent to the worker or operator.

2. The Prior Art

Conventionally, a working machine of this kind is generally designed to discharge exhaust gas from the internal combustion engine through a silencer or a muffler so that the occurrence of noise is minimized to be extent that the workers do not feel uncomfortable, and to further improve operation efficiency.

Unfortunately, however, until now the exhaust gas has been discharged out of the muffler at an extremely high temperature, so that there still remain in the working machine various problems: fires sometimes occur and, at the same time, the extreme rise in temperature of the body of the muffler itself is dangerous to the worker.

SUMMARY OF THE INVENTION

One object of the present invention is to eliminate the above-described problems in the prior arts, and to provide an improved exhaust device for a working machine which effectively lowers the temperature of the muffler itself and of exhaust gas discharged from it to further increase the safety of the working machine.

Thus, an exhaust device according to the present invention comprises an internal combustion engine mounted as a power source, a muffler connected to said internal combustion engine for discharging exhaust gas delivered from the internal combustion engine while damping its sound, and a blower driven by the internal combustion engine, and such an exhaust device is characterized in that a mixing tubular member is disposed opposite to an outlet opening of the muffler through a space interposed between them, and that there is provided an air-flow passage for introducing a part of pressurized air from the blower into the inside of an air guide wall of the outer periphery of the outlet opening.

The exhaust device according to the present invention can thus supply the pressurized air stream introduced from the blower as primary cooling air into the inside of the air guide wall extending around the outer periphery of the outlet opening of the muffler, while external air will be introduced as secondary cooling air into the mixing tubular member through a space between the mixing tubular member and the exhaust gas outlet opening of the muffler. In this manner, the exhaust gas from the muffler is mixed with enough cooling air to decrease the temperature thereof before it flows out of the downstream outlet end. At that time, since the cooling air flows act to draw surrounding air close to the internal combustion engine and the muffler, the air can thus smoothly flow around the internal combustion engine and the muffler to promote the cooling function therefor. Further, the flow of the cooling air serves to suck the exhaust gas from the outlet opening at the distal end of the mixing tubular member, thereby increasing the efficiency of the engine. Specifically, the mixing tubular member receives through its open end a part of the flow of the pressurized air as primary cooling air, which has been introduced through the air-flow passage from the blower and, subsequently, the exhaust gas including the primary cooling air is continuously mixed with secondary cooling air which flows into the mixing tubular member through a space defined between the outlet opening of the muffler and the open end of the mixing tubular member, so that the exhaust gas is supplied with a large quantity of cooling air.

Furthermore, the flow of cooling air sucks external air surrounding the internal combustion engine and the muffler inducing the smooth flow of the intake air to promote cooling and to protect the worker from the risk of high temperatures.

BRIEF DESCRIPTION OF THE DRAWING

The drawing is a cross-sectional view showing the main portion of an exhaust device for a shoulder-type working machine according to the present invention.

PREFERRED EMBODIMENT OF THE INVENTION

The present invention will now be fully described hereinafter with reference to the drawing showing one preferred embodiment.

The particular embodiment shown in the drawing is an example in which the invention is incorporated into a shoulder-type blower working machine. This working machine includes an internal combustion engine 2 as a power source and a blower 3 provided in parallel to the internal combustion engine 2 adjacent to the operator's back, both of them being mounted on a frame 1 which is carried on the operator's back. The internal combustion engine 2 is operated with air-fuel mixture supplied from a carburetor 4, whose exhaust gas is discharged through a muffler 5 while being sound-damped and cooled in a manner as described hereinafter.

The blower 3 rotatably holds an impeller shaft 8 including impeller blades 7 within a volute casing 6, which impeller shaft 8 is in turn integrally connected to a crank shaft of the internal combustion engine 2 causing it to be rotatably driven by the crank shaft. The blower 3 is provided with an air intake opening 9 through which air is sucked into the casing 6. The sucked air is compressed by the rotation of the impeller blades 7 within the casing 6, and the pressurized air is forcibly delivered into a flow channel 10 defined on a periphery of the casing 6. In the case where this working machine is employed as an agricultural chemical sprayer, the pressurized air in the flow channel 10 is ejected out of a spray nozzle which is connected to the distal end of an extended spraying pipe manipulated by the user, when chemical fluid supplied from a reservoir is mixed with the pressurized air causing the chemical fluid to be atomized and dispersedly ejected out of the spray nozzle (not shown). The structure of the chemical fluid sprayer described herein is the same as the conventional-type chemical fluid sprayer.

The exhaust gas delivered into the muffler 5 from the internal combustion engine 2 flows through a spark-arrest net 11 directed toward a cylindrical outlet opening 12 of the muffler 5. The upstream end 18 of a mixing tubular member 13 is located in spaced relation opposite to the downstream end 17 of the outlet opening 12, and these ends are conducted to each other through the annular space 14 interposed between them. The downstream outlet end 19 of the mixing tubular member 13 is opened rearwardly opposite to the operator.

Further, an air-flow passage 15 communicating with the flow channel 10 within the casing 6 of the blower 3 is formed with a hole 21 connected to the inside of an air guide wall 16 extending annularly along the circumference of the exhaust gas outlet opening 12 of the muffler 5, through which hole 21 a part of the pressurized air in the flow channel 10 of the blower 3 blows within the air guide wall 16 in a tangential direction.

According to the above-mentioned structure, a part of the pressurized air in the flow channel 10 of the blower 3 is introduced into the air-flow passage 15 during machine operation, as shown by arrow A; this introduced air flows passing through the downstream end hole 21 of the air-flow passage 15 into the space within air guide wall 16 as primary cooling air and, then, enters into the mixing tubular member 13 under vortex conditions, before the air is finally discharged rearwardly from the downstream outlet end 19. At the same time, the exhaust gas discharged from the muffler 5 flows through the outlet opening 12 and enters into the central area within the mixing tubular member 13.

Thus the flow of the exhaust gas and the pressurized air allows the air around the annular space 14 to function as suction promoting the mixing of this sucked air and the exhaust gas to effectively secondary cool the gas. Specifically, the flow of the pressurized air introduced through the air-flow passage 15 sucks the exhaust gas to promote discharge of the exhaust gas from the muffler 5, thereby further improving the operational efficiency of the internal combustion engine 2.

Furthermore, in the above-described embodiment, the downstream end opening 21 of the air-flow passage 15 is oriented tangentially with respect to the outer periphery of the outlet opening 12 in such a manner that the pressurized air circulates within the air guide wall 16 extending along the outer periphery of the outlet opening 12 of the muffler 5, but the pressurized air may be circumferencially distributed to direct the air into the mixing tubular member 13.

In addition to the above, as shown in the drawing, additional air can be introduced as tertiary cooling air through an annular space 22 between a discharge opening 20 and the outlet end 19, the discharge opening 20 being disposed at a location opposite to the outlet end 19 of the mixing tubular member 13 of a machine cover 24.

What is claimed is:

1. An exhaust device for a working machine comprising:
    an internal combustion engine mounted as a power source;
    a muffler connected to said internal combustion engine for discharging exhaust gas delivered from the internal combustion engine while damping its sound, said muffler having an outlet opening;
    a blower driven by said internal combustion engine;
    a mixing tubular member disposed opposite to the outlet opening of the muffler through a space interposed between the tubular member and the muffler; and
    an air-flow passage for introducing a portion of pressurized air from said blower into the inside of an annular air guide wall on the outer periphery of said outlet opening in a tangential direction.

2. An exhaust device according to claim 1, further comprising a discharge opening disposed at a location opposite to the outlet end of said mixing tubular member defining an annular space for sucking air as tertiary cooling air.

* * * * *